(12) United States Patent
Huang et al.

(10) Patent No.: US 8,353,539 B2
(45) Date of Patent: Jan. 15, 2013

(54) PIPE CONNECTOR WITH FASTENER HAVING SLIDING BLOCKS FOR FASTENING

(75) Inventors: Chien-Feng Huang, Taipei Hsien (TW); Zih-Wei Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 68 days.

(21) Appl. No.: 12/977,083

(22) Filed: Dec. 23, 2010

(65) Prior Publication Data

US 2012/0074685 A1    Mar. 29, 2012

(30) Foreign Application Priority Data

Sep. 29, 2010  (TW) .............................. 99132952 A

(51) Int. Cl.
*F16L 33/22* (2006.01)
(52) U.S. Cl. .......... 285/243; 285/323; 285/15; 285/322; 285/148.22
(58) Field of Classification Search .................. 285/243, 285/322–324, 34, 35, 239, 148.22, 148.23, 285/148.18, 339, 342, 276, 277, 15, 97
See application file for complete search history.

(56) References Cited

U.S. PATENT DOCUMENTS

| 2,727,763 | A | * | 12/1955 | Ziep | 285/342 |
|---|---|---|---|---|---|
| 3,462,174 | A | * | 8/1969 | Raley | 285/14 |
| 3,702,707 | A | * | 11/1972 | Rosan, Sr. | 285/23 |
| 4,119,335 | A | * | 10/1978 | Rieffle et al. | 285/337 |
| 4,257,629 | A | * | 3/1981 | Maple et al. | 285/12 |
| 4,632,437 | A | * | 12/1986 | Robson et al. | 285/310 |
| 5,078,430 | A | * | 1/1992 | St. Onge | 285/15 |
| 5,797,633 | A | * | 8/1998 | Katzer et al. | 285/243 |
| 6,378,915 | B1 | * | 4/2002 | Katz | 285/342 |
| 7,255,373 | B2 | * | 8/2007 | Pridham | 285/249 |
| 7,744,132 | B2 | * | 6/2010 | Tabaro et al. | 285/148.1 |
| 7,837,238 | B2 | * | 11/2010 | Krausz et al. | 285/421 |
| 2004/0051312 | A1 | * | 3/2004 | Haviland | 285/276 |
| 2006/0192381 | A1 | * | 8/2006 | Moretti et al. | 285/305 |
| 2006/0284412 | A1 | * | 12/2006 | Shipman | 285/12 |
| 2009/0127854 | A1 | * | 5/2009 | Jensen | 285/421 |

* cited by examiner

*Primary Examiner* — Daniel P. Stodola
*Assistant Examiner* — James Linford
(74) *Attorney, Agent, or Firm* — Altis Law Group, Inc.

(57) ABSTRACT

A pipe connector for connecting to a first pipe includes a second pipe and a fastener. The second pipe has a number of connection sections of difference outer diameters, one of which is fittingly coupled to the first pipe. The fastener sleeves on the first pipe and the second pipe and fastens the first pipe to the second pipe.

7 Claims, 3 Drawing Sheets

PIPE CONNECTOR WITH FASTENER HAVING SLIDING BLOCKS FOR FASTENING

BACKGROUND

1. Technical Field

The present disclosure relates to a pipe connector.

2. Description of Related Art

When replacing an old or damaged pipe, it is required that a substitute pipe has the same size as the old pipe so the substitute pipe can be fittingly coupled to a remaining pipe. However, sometimes, it is hard to find a suitable substitute pipe that will match with the old pipe.

Therefore, it is desirable to provide a pipe connector, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
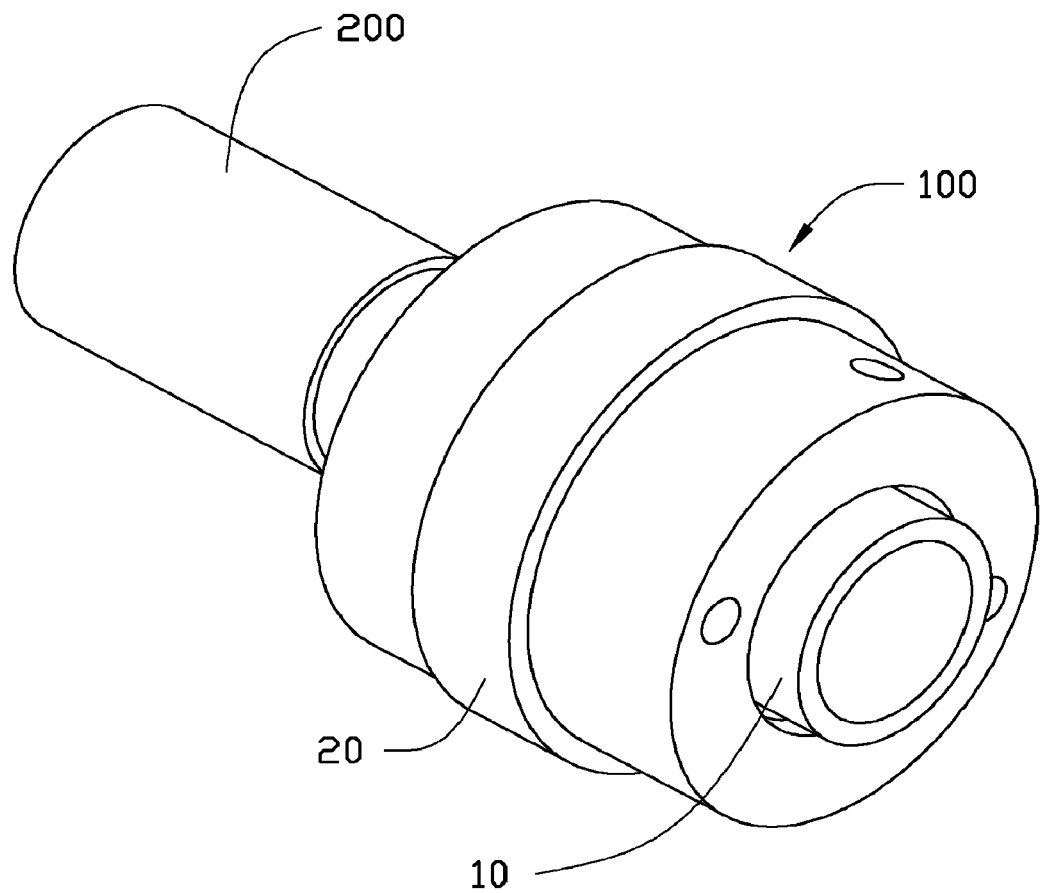
FIG. 1 is an isometric, assembled, and schematic view of a pipe connector for connecting to a first pipe, according to an embodiment.
Figure 2:
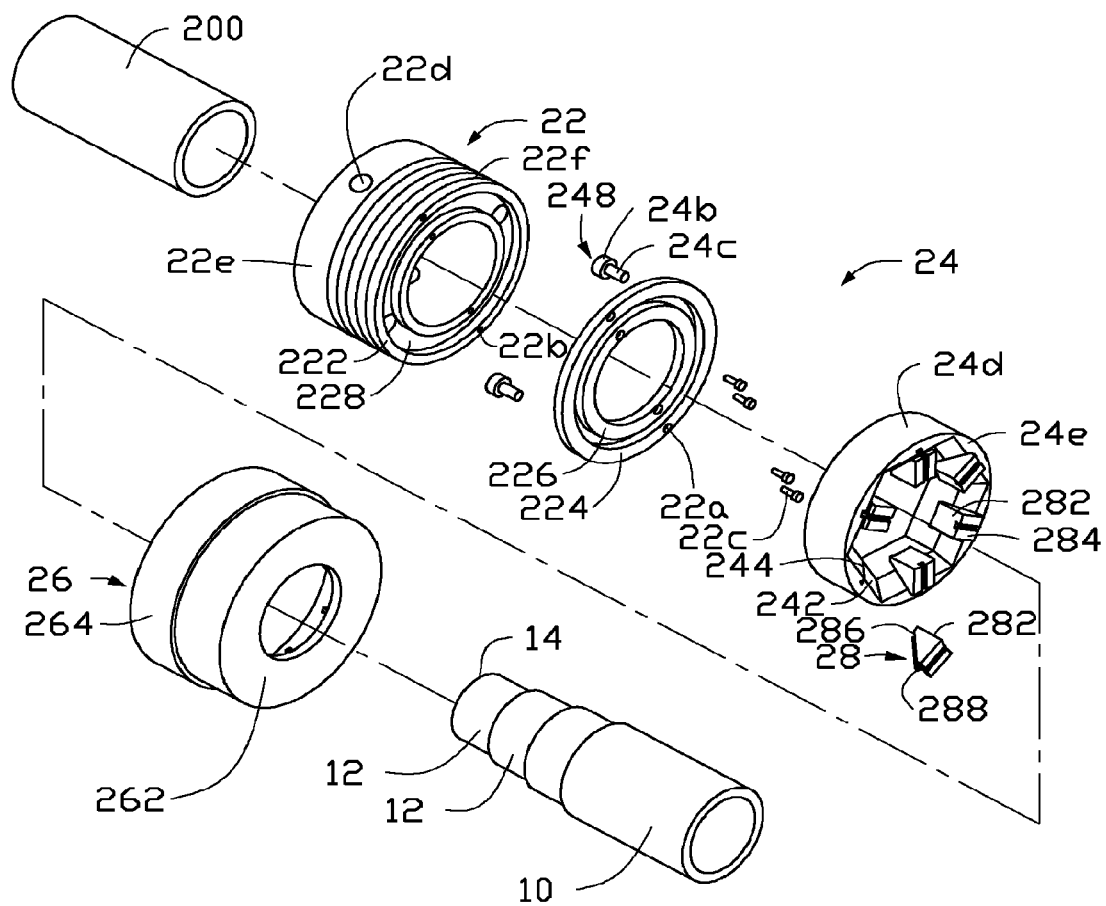
FIG. 2 is an exploded view of the pipe connector and the first pipe of FIG. 1.
Figure 3:
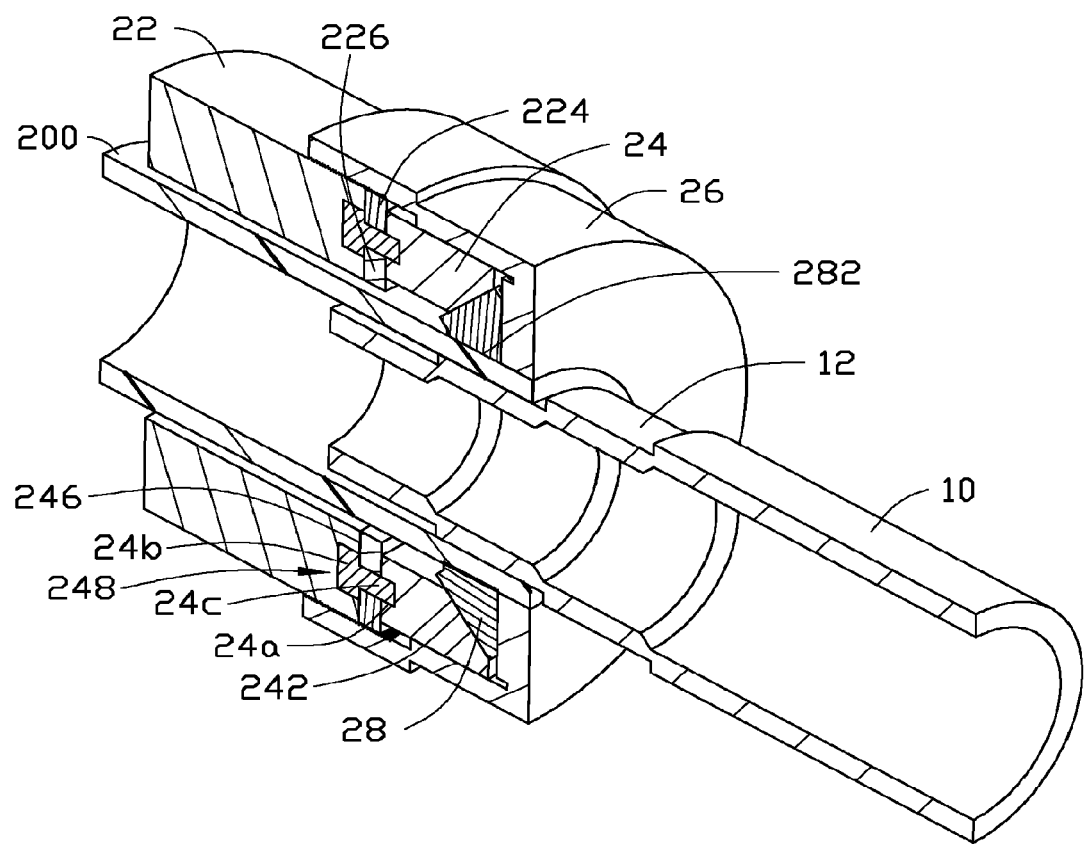
FIG. 3 is a cross-sectional view of the pipe connector and the first pipe of FIG. 1.

Referring to FIGS. 1-3, a pipe connector 100, according to one embodiment, is configured for connecting to a first pipe 200. The pipe connector 100 includes a second pipe 10 and a fastener 20. The second pipe 10 includes a number of connection sections 12, in this embodiment there are four, one of which has a matched size of the first pipe and can be fittingly coupled to the first pipe 200. The fastener 20 fastens the first pipe 200 to the second pipe 10.

In this embodiment, the first pipe 200 is a hose (flexible pipe), such as a plastic hose, and the second pipe 10 is a rigid pipe, such as a steel pipe. The second pipe 10 includes a connection end 14 that extends into the first pipe 10. The outer diameters of the connection sections 12 gradually increase from the connection end 14.

The fastener 20 includes an inner barrel 22, a slide-guiding barrel 24, an outer barrel 26, and a number of triangular sliding blocks 28.

The inner barrel 22 includes a first barrel body 22e, a first fixing ring 224, a second fixing ring 226, and two pairs of first screws 22c. The first barrel body 22e includes a first end surface 222 and defines an annular groove 228, which is substantially coaxial with the first barrel body 22e, in the first end surface 22e. The first barrel body 22e also diametrically defines two pairs of first threaded holes 22b in the first end surface 222, corresponding to the two pairs of first screws 22c. One pair of first threaded holes 22b is located inside the annular groove 228, and the other is located outside the annular groove 228. Both the first fixing ring 224 and the second fixing ring 226 diametrically define a pair of through holes 22a, corresponding to the two pairs of the first threaded holes 22b. The inner diameter of the first fixing ring 224 is smaller than the outer diameter of the annular groove 228. The outer diameter of the second fixing ring 226 is larger than the inner diameter of the annular groove 228. The first barrel body 22e forms an outer threaded section 22f in the outer surface thereof adjacent to the first end surface 222. The first barrel body 22e also defines an installation threaded hole 22d in the outer surface thereof outside the outer threaded section 22f to allow a twisting tool (not shown) installed therein for facilitating twisting of the first barrel body 22e.

The slide-guiding barrel 24 includes a second barrel body 24d and a pair of second screws 248. The outer diameter of the second barrel body 24d is smaller than outer diameter of the first barrel body 22e and the inner diameter of the second barrel body 24d is larger than the inner diameter of the first barrel body 22e. The second barrel body 24d includes a second end surface 246 and a third end surface 24e opposite to the second end surface 246. The second barrel body 24d diametrically defines a pair of second threaded holes 24a in the second end surface 246, corresponding to the annular groove 228 and the second screws 248. The second barrel body 24d also forms a number of beveled surfaces 242, in this embodiment there are six, in the third end surface 24e. The beveled surfaces 242 are arranged around the central axis of the second barrel body 24d and extend toward the central axis of the second barrel body 24d and the second end surface 246. The second barrel body 24d defines a number of, six in this embodiment, guiding grooves 244 in the respective beveled surfaces 242. The guiding grooves 244 extend toward the central axis of the second barrel body 24d and the second end surface 246. Each second screw 248 includes a cap 24b and a bolt 24c extending outward from the cap 24b. The diameter of the cap 24b is smaller than the difference between the outer diameter and the inner diameter of the annular groove 228 but is larger than the difference between the inner diameter of the first fixing ring 224 and the outer diameter of the second fixing ring 226. The diameter of the bolt 24c is smaller than the difference between the inner diameter of the first fixing ring 224 and the outer diameter of the second fixing ring 226.

The outer barrel 26 includes a third barrel body 264 and an annular stop portion 262 extending inward from an end of the third barrel body 264. The third barrel body 264 defines an inner threaded section (not labeled) in the inner surface at an end that is away from the annular stop portion 262.

Each triangular sliding block 28 includes a first side surface 282, a second side surface 284 connecting the first surface 282, and a third side surface 286 connecting the first side surface 282 and the second side surface 284, and a slider 288 protruding from the third side surface 286, which corresponds to a respective guiding groove 244.

In assembly, the first pipe 200 sleeves on the second pipe 10 and is fittingly coupled to the connection section 14 having the matched size of the first pipe 200. The second screws 248 are placed into the annular groove 228 such that the caps 24 are received within the annular groove 228 and the bolts 24c extend out of the annular groove 228. Then, the first fixing ring 224 and the second fixing ring 226 are attached to the first end surface 222 by screwing the first screws 122c through the respective through holes 22a and into the respective first threaded holes 22b. Then, the second screws 248 (the bolts 24c) screw into the respective second threaded holes 24a. Thus, the slide-guiding barrel 24 is rotatably connected to the inner barrel 22. The connected inner barrel 22 and the slide-guiding barrel 24 are sleeved onto the first pipe 200. The sliding blocks 28 are disposed on the respective beveled surfaces 242 such that the sliders 288 slide in the respective guiding grooves 244 and the first side surfaces 282 contact the first pipe 200. Then, the outer barrel 26 sleeves on the inner barrel 22 and are threadedly coupled to the inner barrel 22 with the outer threaded section 22f and the inner threaded section. A twisting tool (not shown) is installed into the installation threaded hole 22d to facilitate screwing the inner barrel 22 into the outer barrel 26. The outer barrel 26 is threadedly slid towards the inner barrel 22. The annular stop portion 262 presses the second side surface 284 so the triangular sliding blocks 28 can slide toward the center of the pipe connector 100 along the respective guiding grooves 244 on the respective beveled surfaces 242. The first side surfaces 282 press the first pipe 200 toward the second pipe 10 until the outer barrel 26 cannot be twisted any more using the twisting tool. Thus, the first pipe 200 is tightly fastened to the second pipe 10 with the fastener 20.

The number of the first threaded holes 22b, the through holes 22a, the first screws 22c, the second threaded holes 24a, and the second screws 248 are not limited to this embodiment but can changed depending on requirements.

Since the slide-guiding barrel 24 is rotatably connected to the inner barrel 22, the outer barrel 26 can still, slide along with the slide-guiding barrel 24, threadedly towards the inner barrel 22 after the second side surfaces 284 are stuck by the annular stop portion 262 due to friction. Thus, the triangular sliding blocks 28 can be further forced to slide toward the center of the pipe connector 100 to further press the first pipe 200 toward the second pipe 10. However, the connection between the slide-guiding barrel 24 and the inner barrel 22 is not limited to this embodiment. The fastener 20 is not limited to this embodiment but can take on other forms too.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A pipe connector, comprising:
  a first pipe;
  a second pipe having a plurality of connection sections of difference outer diameters, one of which is capable of being fittingly coupled to the first pipe; and
  a fastener comprising:
    an inner barrel sleeve on the first pipe;
    an outer barrel sleeve on and threadedly coupled with the inner barrel, the outer barrel comprising an annular stop portion extending inward from an end thereof and distant from the inner barrel;
    a slide-guiding barrel located between the first pipe, the inner barrel, and the outer barrel, the slide-guiding barrel defining a plurality of beveled surfaces and a plurality of guiding grooves in the respective beveled surfaces, the beveled surfaces facing the annular stop portion and being arranged around the first pipe, both the beveled surfaces and the guiding grooves extending toward a center of the pipe connector and away from the annular stop portion; and
    a plurality of sliding blocks positioned on the respective beveled surfaces, each of the sliding blocks comprising a first side surface contacting the first pipe and a second side surface pressed by the annular stop portion when the outer barrel threadedly slides toward the inner barrel to force the sliding block to slide toward the center of the pipe connector along a corresponding guiding groove such that the first side surface presses the first pipe toward the second pipe;
  wherein the inner barrel includes a first barrel body, a first fixing ring, and a second fixing ring, the first barrel body comprises a first end surface and defines an annular groove in the first end surface, the slide-guiding barrel comprises a second barrel body and a plurality of screws, the second barrel body comprises a second end surface and defines a plurality of threaded holes corresponding to the screws; each of the screws comprises a cap received in the annular groove and a bolt extending out of the annular groove, the first fixing ring and the second fixing ring are attached to the first end surface to prevent the caps from escaping out of the annular groove, the bolts screw into the respective threaded holes.

2. The pipe connector of claim 1, wherein the first pipe is a hose, the second pipe is a rigid pipe, the second pipe comprises a connection end that extends into the first pipe, the outer diameters of the connection sections gradually increase from the connection end.

3. The pipe connector of claim 1, wherein the slide-guiding barrel is rotatably connected to the inner barrel.

4. A pipe connector, comprising:
  a first pipe;
  a second pipe having a plurality of connection sections of difference outer diameters, one of which is capable of being fittingly coupled to the first pipe; and
  a fastener configured for fastening the first pipe to the second pipe;
  wherein the fastener comprises:
    an inner barrel sleeve on the first pipe;
    an outer barrel threadedly coupled with the inner barrel, the outer barrel comprising an annular stop portion extending from an end of the outer barrel and distant from the inner barrel, the outer diameter of the annular stop portion gradually reducing from the end of the outer barrel;
    a slide-guiding barrel sleeve on the first pipe and located between the inner barrel and the outer barrel, the slide-guiding barrel defining a plurality of beveled surfaces and a plurality of guiding grooves in the respective beveled surfaces, the beveled surfaces facing the annular stop portion and being arranged around the first pipe, both the beveled surfaces and the guiding grooves extending toward a center of the pipe connector and away from the annular stop portion; and
    a plurality of sliding blocks, pressed by the annular stop portion, slidable toward the center of the pipe connector along the respective guiding grooves on the respective beveled surfaces to press the first pipe toward the second pipe when the outer barrel threadedly slides toward the inner barrel;
  wherein the inner barrel includes a first barrel body, a first fixing ring, and a second fixing ring, the first barrel body comprises a first end surface and defines an annular groove in the first end surface, the slide-guiding barrel comprises a second barrel body and a plurality of screws, the second barrel body comprises a second end surface and defines a plurality of threaded holes corresponding to the screws; each of the screws comprises a cap received in the annular groove and a bolt extending out of the annular groove, the first fixing ring and the second fixing ring are attached to the first end surface to prevent the caps from escaping out of the annular groove, the bolts screw into the respective threaded holes.

5. The pipe connector of claim 4, wherein the first pipe is a hose, the second pipe is a rigid pipe, the second pipe comprises a connection end that extends into the first pipe, the outer diameters of the connection sections gradually increase from the connection end.

6. The pipe connector of claim 4, wherein the slide-guiding barrel is rotatably connected to the inner barrel.

7. The pipe connector of claim 4, wherein each of the sliding blocks is triangular-shaped and comprises a first side surface, a second side surface and a third side surface, the first side surface contacts the first pipe, the second side surface is pressed by the annular stop portion when the outer barrel threadedly slides toward the inner barrel to force the sliding block to slide toward the center of the pipe connector along a corresponding guiding groove such that the first side surface presses the first pipe toward the second pipe, the third side surface connects the first side surface to the second side surface, a slider protrudes from the third side surface, and the slider is received in the corresponding guiding groove.

* * * * *